(12) United States Patent
Cho et al.

(10) Patent No.: US 6,872,270 B2
(45) Date of Patent: Mar. 29, 2005

(54) BUBBLE PACK CUSHIONED COMPOSITE, METHOD OF MAKING AND ARTICLE MADE THEREFROM

(75) Inventors: Byoung In Cho, Cohutta, GA (US); Jeffrey W. Manning, Fort Oglethorpe, GA (US); M. Brad Giddens, Adairsville, GA (US); James W. Thomte, Ringgold, GA (US)

(73) Assignee: Textile Rubber & Chemical Co., Dalton, GA (US)

( * ) Notice: Subject to any disclaimer, the term of this patent is extended or adjusted under 35 U.S.C. 154(b) by 196 days.

(21) Appl. No.: 09/838,535

(22) Filed: Apr. 19, 2001

(65) Prior Publication Data

US 2002/0182419 A1 Dec. 5, 2002

(51) Int. Cl.$^7$ .............................. B32B 31/14; B32B 5/18
(52) U.S. Cl. .................... 156/79; 156/243; 156/244.12; 156/307.3; 156/500; 36/44; 264/167; 264/171.13; 264/212; 264/46.1; 264/46.6; 427/373; 427/393.5; 427/385.5; 206/524; 206/523
(58) Field of Search ................................. 206/523, 524; 428/304.4; 36/44; 156/243, 244.12, 307.3, 79, 309.6, 500; 264/167, 171.13, 212, 46.1, 46.6, DIG. 57; 427/373, 393.5, 385.5

(56) References Cited

U.S. PATENT DOCUMENTS

| 2,726,186 | A | * | 12/1955 | Alderfer | 428/187 |
| 4,132,817 | A | * | 1/1979 | Tillotson | 427/422 |
| 4,267,927 | A | | 5/1981 | English, Jr. | 206/524 |
| 6,391,935 | B1 | * | 5/2002 | Hager et al. | 521/170 |

FOREIGN PATENT DOCUMENTS

| JP | 56-62137 | 5/1981 |
| JP | 57-59731 | 4/1982 |
| JP | 57-123030 | 7/1982 |

OTHER PUBLICATIONS

Brochure entitled "Air Cellular Packaging Products," distributed by the Sealed Air Corporation, 1995, 8 pages.*

* cited by examiner

*Primary Examiner*—Linda Gray
(74) *Attorney, Agent, or Firm*—Kilpatrick Stockton LLP (57) ABSTRACT

There is disclosed a method of forming a foam product, comprising the steps of forming a layer of uncured polymeric foam; applying to the layer of uncured foam a layer of bubble pack, such that the bubbles that extend outwardly from the bubble pack at least partially penetrate into the uncured foam; and curing the layer of uncured polymeric foam. Products made by the process are also disclosed.

40 Claims, 6 Drawing Sheets

BUBBLE PACK CUSHIONED COMPOSITE, METHOD OF MAKING AND ARTICLE MADE THEREFROM

FIELD OF INVENTION

The present invention relates generally to cushioned foam compositions, and, more specifically, to polymeric foam compositions containing a bubble pack cushion; especially, polyurethane foam compositions containing a bubble pack cushion.

BACKGROUND OF THE INVENTION

Polymeric foams or cellular compositions, such as polyurethane foams, are well known in the art. Polymeric foam compositions can be open celled, closed celled or mixtures thereof. Cellular polyurethane can be formed by two different processes, i.e., chemical blowing and mechanical frothing. Foamed cellular polyurethane is formed by including a foaming or blowing agent in the polyurethane composition. The blowing agent reacts with the polyurethane-forming components, or degrades upon heating, to generate a gas, such as carbon dioxide, that produces the bubbles that form the cells within the foam. By controlling other factors of the reaction and/or curing, the bubbles can remain unbroken, thereby forming a closed-cell foam, or they can be broken, thereby forming an open-cell foam. Curing of the foam can result from merely allowing sufficient time for the reaction to occur, applying heat to accelerate the reaction or applying heat to remove water and cause polymerization. All of these processes are well known in the art.

Mechanically frothed cellular polyurethane is formed by including a surfactant, such as silicon glycol copolymer, in the polyurethane composition and then mechanically stirring or shearing the composition to mix air therewith thereby forming bubbles in the liquid composition. Further stirring or shearing reduces the size of the bubbles within the foam so that course or fine grade foams can be produced. All of these processes are also well known in the art.

Cellular polyurethane is used for numerous items, such as cushions and textile coatings, and is also used to make shoe insoles, automotive trim, carpet padding, and the like.

Although polymeric foams, including polyurethane foams, have cushioning properties, it is sometimes desirable to augment the cushioning properties of the foam by combining the polymeric foam with another cushioning member. U.S. Pat. No. 4,356,642 (incorporated herein by reference) discloses a support device, such as for an innersole for footwear, that includes at least one cushion layer comprising closely spaced, discrete air pockets entrapped between plastic film. The air cushion layer is adhered to a layer of soft, flexible, open cell foam, by a layer of pressure sensitive adhesive. The patent discloses that the adhesive impregnates the foam layer and when in use under pressure, coats the plastic film, thereby reinforcing it against leakage or rupture and conforming it semi-permanently in the pressure-distorted shape.

U.S. Pat. No. 4,716,069 (incorporated herein by reference) discloses a plastic laminate material comprising a low density foamed polymeric material and a lamina of high density non-foamed polymeric material. The laminate is made in such a way that air is entrapped between the lamina. The laminate is disclosed as being useful as a protective packaging material.

Other patents disclosing multiple layers of cushioning material include U.S. Pat. Nos. 3,213,071; 3,857,731; 4,129,672 and 4,267,927.

The foregoing prior art requires the use of multiple layers, including adhesive layers, and relatively complicated methods of manufacture. Therefore, a need exists for a cushioned polymeric foam composition that is relatively simple and inexpensive to manufacture.

SUMMARY OF THE INVENTION

The present invention satisfies the above-described needs by providing an improved method of forming a cushioned foam product. The method comprises forming a layer of uncured thermosetting polyurethane foam; applying to the layer of uncured foam a layer of bubble pack made of thermoplastic polyurethane, such that the bubbles that extend outwardly from the bubble pack at least partially penetrate into the uncured foam; and curing the layer of uncured thermosetting polyurethane foam, whereby the thermosetting polyurethane foam chemically bonds to the thermoplastic polyurethane bubble pack.

In an alternate embodiment, the present invention comprises an improved method of forming a foam product. The method comprises applying to a layer of bubble pack made of thermoplastic polyurethane a layer of frothed, uncured thermosetting polyurethane foam, such that the bubbles that extend outwardly from the bubble pack are at least partially surrounded by the uncured foam; and curing the layer of uncured polymeric foam, whereby the thermosetting polyurethane foam chemically bonds to the thermoplastic polyurethane bubble pack.

In an alternate embodiment, the present invention comprises an improved method of forming a foam product. The method comprises applying to a substrate a layer of frothed, uncured thermosetting polyurethane foam; applying to the layer of uncured foam on the substrate a layer of bubble pack made of thermoplastic polyurethane, such that bubbles that extend outwardly from the bubble pack at least partially penetrate into the uncured foam; and curing the layer of uncured foam to form a laminate comprising the substrate, the cured foam and the bubble pack.

In an alternate embodiment, the present invention comprises an improved method of forming a foam product. The method comprises applying to a layer of bubble pack a layer of uncured polymeric foam, such that the bubbles that extend outwardly from the bubble pack are at least partially surrounded by the uncured foam, applying to the layer of uncured polymeric foam on the bubble pack a substrate, and curing the layer of uncured polymeric foam.

The present invention also comprises a product comprising a layer of thermosetting polyurethane foam bonded to a layer of bubble pack made from thermoplastic polyurethane, wherein said layer of foam surrounds at least a portion of each bubble of a plurality of bubbles that project outwardly from said bubble pack layer.

The present invention further comprises a shoe insole comprising a layer of thermosetting polyurethane foam bonded to a layer of bubble pack made from thermoplastic polyurethane, wherein said layer of foam surrounds at least a portion of each bubble of a plurality of bubbles that project outwardly from said bubble pack layer.

Additionally, the present invention comprises a carpet comprising a backing layer; tufts of yarn extending through the backing layer to form a face pile on one side of the backing layer; a layer of thermosetting polyurethane foam attached to the side of the backing layer opposite the face pile; and a layer of bubble pack made of thermoplastic polyurethane adhered to the layer of polymeric foam, wherein the layer of polymeric foam surrounds at least a portion of each bubble of a plurality of bubbles that project outwardly from the bubble pack layer.

In an alternate embodiment, the present invention comprises a method of forming a product comprising the steps of applying to a layer of bubble pack a viscoelastic composition such that the viscoelastic composition fills interstices between the bubbles of the bubble pack; and curing the viscoelastic composition. The method can also be practiced by applying the bubble pack to a layer of uncured viscoelastic composition.

In yet another alternate embodiment, the present invention comprises articles, such as fabrics, carpets, and shoe insoles, comprising a layer of bubble pack including a plurality of bubble that extend outwardly from the bubble pack and interstices between adjacent bubble of the bubble pack, the interstices being at least partially filled with a viscoelastic composition, such as viscoelastic polyurethane.

Accordingly, it is an object of the present invention to provide an improved cushioned polymeric foam material.

Another object of the present invention is to provide an improved textile material including a cushioning polymeric foam.

A further object of the present invention is to provide an improved shoe insole.

Yet another object of the present invention is to provide an improved carpet.

Still another object of the present invention is to provide a method of making a cushioned polymeric foam material that is relatively simple.

Another object of the present invention is to provide an improved bubble pack product.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
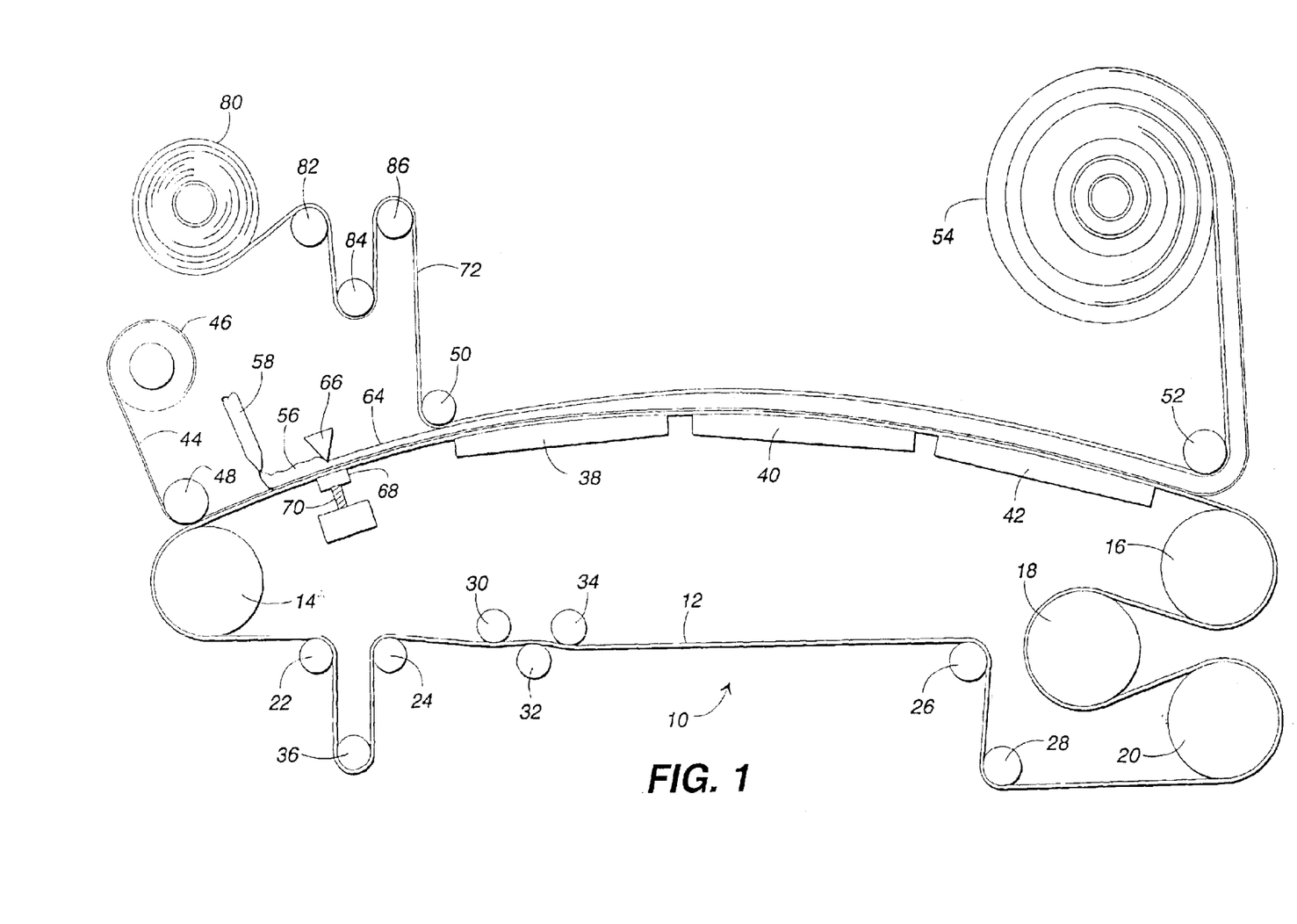
FIG. 1 is schematic view of a disclosed embodiment of apparatus for making the cushioned polymeric foam composition of the present invention.

With reference to the drawing in which like numbers indicate like elements throughout the several views, it will be seen that there is disclosed an apparatus 10 for making a cushioned polymeric foam product. The apparatus 10 comprises an endless conveyor belt 12 extending along an endless conveyor path over four drive rollers 14, 16, 18, 20 which are driven by an electric motor (not shown), idle rollers 22, 24, 26, 28, belt guide rollers 30, 32, 34 and belt tensioner roller 36. From the drive roller 16, the conveyor belt 12, which preferably is constructed from Teflon coated fiber glass, is seen to pass around drive rollers 18, 20. The belt 12 then passes around idler rollers 28, 26 and over belt guide rollers 34, 32, 30 so as to properly position the belt. The belt 12 is further seen to pass over idler roller 24, belt tensioner roller 36, which is movable in a vertical direction, idler roller 22 and drive roller 14. From the drive roller 14, the belt travels in an arcuate path over a series of heated plates 38, 40, 42.

A substrate 44 is fed from a supply roll 46 around an idler roller 48 and into contact with the belt 12. The substrate 44 supported by the belt 12 travels through the arcuate path between idler roller 48, under marriage bar 50 to idler roller 52 where the laminated substrate described further hereinbelow is stripped from the belt and rolled into a take-up roll 54. The substrate 44 can be any suitable material, such as a carpet (tufted or woven), a textile fabric (woven or nonwoven), paper, "Tacfast" material, a plastic film (polyethylene, polypropylene, thermoplastic polyurethane, and the like), leather, simulated leather and the like. In the case of a carpet, which typically comprises a layer of backing material and tufts of yarn extending through the backing layer to form a face pile on one side of said backing layer. In such a construction, the layer of thermosetting polyurethane foam is attached to the side of the backing material opposite the face pile. For purposes of the present disclosure, the substrate will be illustrated as a fabric.

After the fabric 44 passes under the roller 48 and is supported by the belt 12, a puddle 56 of frothed polymer-forming reactants is deposited onto the fabric by a traversing dispensing hose 58 connected to a conventional frothing machine (not shown). The dispensing hose 58 has a traverse time of about one and one-half seconds per pass across the conveyor belt 12, which is typically 14 feet wide.

Polymeric foam or cellular compositions are well known to those skilled in the art and the particular composition of the polymer-forming components is not a critical aspect of the present invention. Any chemically blown or mechanically frothed polymer-forming composition that produces either an open cell or closed cell foam can be used. However, it is especially preferred that the polymer-forming composition be a polyurethane foam-forming composition; particularly, a thermosetting polyurethane foam-forming composition. When the polymeric foam dispensed onto the fabric 44 by the hose 58 is a thermosetting polyurethane foam, it is preferred that the foam has a density of between approximately 2 and 30 pounds per cubic foot; preferably, between approximately 2 and 25 pounds per cubic foot.

Figure 5:
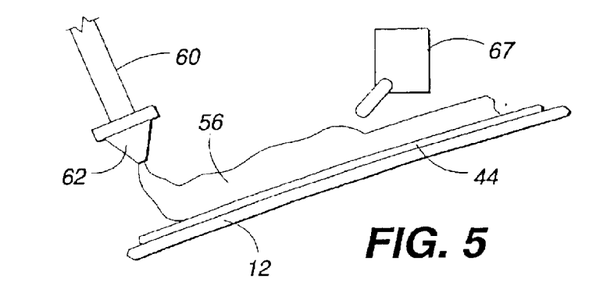
FIG. 5 is an alternate, partial, schematic, detail view of the apparatus for making the cushioned polymeric foam composition of the present invention.

Although the present invention has been illustrated as using a mechanically frothed polyurethane foam, it is also specifically contemplated that the polyurethane foam can be formed in situ with a blowing agent. In such a case, after the fabric 44 passes under the roller 48 and is supported by the belt 12, the puddle 56 of polyurethane-forming reactants, including a blowing agent, is deposited onto the fabric by a traversing mixer 60 (FIG. 5) having a downwardly extending spout 62 disposed above the conveyor belt 12. The polyurethane-forming reactants and the traversing mixer are cooled so that the temperature of the mixed reactants, as they emerge from the mixer, may be maintained at from about 60° to about 100° F., preferably about 75° F. in order to avoid premature blowing of the foam.

Polyurethane is a polymerization product of a polyol component, an isocyanate component, water (optional) and a catalyst system that promotes a polymerization reaction between the isocyanate component and the polyol component to form the polyurethane. The polyol component may contain either a single polyol or a mixture of two or more polyols. The specific polyols useful in the manufacture of polyurethane elastomers are well-known in the art and include aliphatic, alicyclic and aromatic polyols. More specifically, the polyol component useful in this invention has an average functionality within the range of 2–8, preferably within the range of 2–3, and an average molecular weight of from about 900 to about 9000, preferably from about 1000 to about 6000. The polyol component may contain isomeric and polymeric polyols. Additionally, the polyol component has a hydroxyl number of less than about 120, preferably less than about 93.5.

The preferred polyols suitable for use in this process are ethylene glycol; diethylene glycol; propylene glycol; dipropylene glycol; glycerin; sucrose; butylene glycol; polyether polyols derived from ethylene oxide, propylene oxide, and mixtures of such oxides; polyether polyols derived from propylene oxide and capped with ethylene oxide; polyethylene glycol; polypropylene glycol; polybutylene glycol; 1,2-polydimethylene glycol; polydecamethylene glycol and mixtures of the above polyols.

Blowing of the polyurethane composition, if desired, is effected by controlling the catalyst system, the water concentration and the isocyanate level. Generally, water is present in the reaction mixture from between approximately 0.01 to 5.0 parts per hundred parts of polyol, preferably between 0.1 parts and 3 parts, over and above the water normally present in the reaction mixture. The catalyst system not only must effect rapid curing but also must control formation of carbon dioxide resulting from the reaction of water and isocyanate. Blowing should be controlled to effect expansion between about 5% and 200%, preferably between approximately 7% and 100%, so that a carpet yarn loop back stitch is saturated with reactants and the reactants expand sufficiently prior to curing. Suitable catalysts are those which promote polyurethane formation and concurrently promote the blowing reaction. Preferred catalysts are organic metal compounds, amines, and metal soaps, such catalysts include dibutyl tin dilaurate and stannous octanoate.

The isocyanate component may contain either a single isocyanate or a mixture of two or more isocyanates. The specific isocyanates useful in the manufacture of polyurethane elastomers are well-known in the art and include aliphatic, alicyclic and aromatic isocyanates. Preferred isocyanates have an average functionality within the range of 2–8, preferably within the range of 2–5. Examples of preferred isocyanates are 2,4-toluene diisocyanate; 2,6-toluene diisocyanate; 1,6-hexamethylene diisocyanate; naphthalene-1,4-diisocyanate; diphenyl methane 4,4'-diisocyanate; 4,4'-diphenylene diisocyanate; 3,3'-dimethoxy biphenylene diisocyanate; polymeric forms of the above diisocyanates and mixtures of the above diisocyanates. The isocyanate usually is employed in stoichiometric excess to assure complete reaction with the functional groups of the polyol and with the water which is present. Preferably, from 20 to 80 parts isocyanate per one hundred parts of polyol are used in the reaction mixture.

A general thermosetting polyurethane formulation that is useful in the present invention is shown in Table 1 below:

TABLE 1

| Ingredient | Parts |
| --- | --- |
| Polyol A (triol) | |
| Polyol B (diol) | |
| Polyol C (Chain extender) | 100 |
| Surfactant (silicon glycol copolymer) | 0–2 |
| Water | 0–2 |
| Filler | 0–400 |
| Additives | 0–50 |
| Catalysts | 0.002–3 |
| Isocyanate | sufficient (index 70–130) |

Other polyurethane compositions that are useful in the present invention are disclosed in U.S. Pat. No. 5,159,012 (incorporated herein by reference).

In order to assure a uniform lay down of frothed polyurethane-forming reactants onto the fabric 44, the end of the dispenser hose is positioned from approximately 0.25 to 4 inches, preferably 1⅜ inches, above the belt 12. Additionally, the center line of the traversing dispenser hose 58 is positioned between approximately 1 and 6 inches upstream of a spreading device.

The deposited frothed, thermosetting polyurethane reactant mixture on the fabric 44 is then smoothed into a reactive layer 64 by a doctor bar 66. In order to aid in the uniform spreading of the uncured frothed thermosetting polyurethane reactants onto the fabric 44, the belt 12 is flattened by applying a linear force to the belt of from about 1 pound to about 10 pounds, preferably about 5 pounds, per inch of belt width and then drawing the tensioned belt over a ledger bar 68 positioned immediately below the doctor bar 66. This tensioning operation is accomplished by the belt tension-adjusting roller 36 which comprises a weighted floating roll. To assure uniform separation of the conveyor belt 12 and the doctor bar 66, the ledger bar is adjustably mounted on jackscrews 70 which raise or lower the ends of the ledger bar. The doctor bar 66 is adjusted to smooth the puddle 56 of frothed thermosetting polyurethane-forming reactants into a layer between approximately 3/32 and 1 inch thick.

As indicated above, the present invention covers polyurethane foams formed by both mechanical frothing and chemical blowing. When the polyurethane reactant mixture is to be chemically blown, the puddle 56 of thermosetting polyurethane-forming reactants (FIG. 5) is smoothed and spread into a reactive layer by an air knife. The air knife consists of a compressed air jet stream which is directed toward the puddle 56 of deposited reactants by means of a rectangular slot in conduit 67. The slot has an opening of from 0.005 to 0.1 inches; preferably 0.013 inches, wide. Air at a pressure of from 2 to 60 ounces per square inch; preferably, 6 to 24 ounces per square inch, is emitted from the slot. The outlet of the slot is positioned 0.05 to 2 inches; preferably 0.375 inches, from the belt and has an angular position relative to the belt so that the air impinges the belt with an inclined angle between the air stream and the belt of from 10° to 60°; preferably from 20° to 25°. To further control the rate of reaction of the urethane reactants, the air jet temperature is controlled to a temperature between 50° and 100° F.; preferably 65° F.

Figure 4:
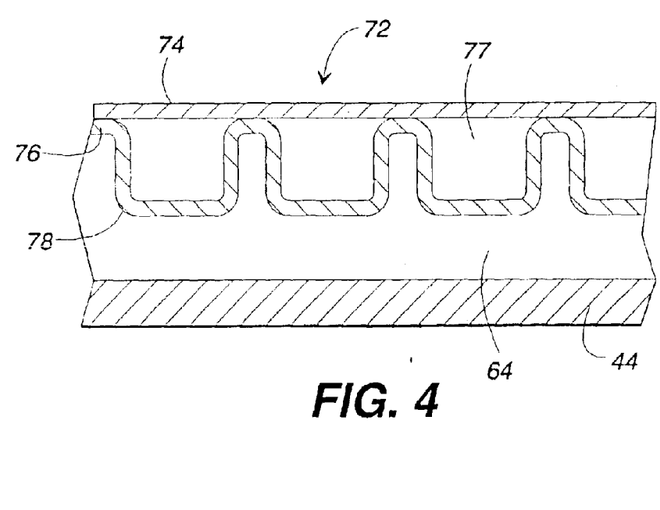
FIG. 4 is a cross-sectional view of the cushioned polymeric foam composition made by the process shown in FIG. 1.

Simultaneously with the deposition of the thermosetting polyurethane-forming reactants onto the conveyor belt, a single layer of bubble pack 72 is applied to the top of the foam layer 64. The bubble pack 72 comprises a base layer 74 (FIG. 4) of plastic film and a top layer 76 of plastic film. The plastic film can be any suitable plastic, such as polyethylene, polypropylene or polyurethane. It is preferred that the bubble pack 72; i.e., the layers 74, 76, be made from a thermoplastic polyurethane. The plastic film 74, 76 has a preferred thickness of between approximately 0.5 and 15 mils. The top layer 76 is bonded to the base layer 74 at selected locations so that air is trapped in a plurality of spaced air pockets 77 formed between the two layers of plastic film. When thusly formed, a plurality of bubbles 78 project outwardly from the laminated base and top layers 74, 76, respectively. The height of the bubbles 78 is preferably between approximately 1/16 and 1 inch and the diameter is between approximately 1/16 and 1¼ inches. The relationship between the bubbles of the bubble pack and the foam is such that the gauge of the foam can be greater than the height of the bubbles or it can be equal to the height of the bubbles.

Although the present invention has been illustrated as using bubble pack having round bubbles, it is specifically contemplated that air pockets 77 or bubbles 78 of different geometric shapes can be used. Bubble pack useful in the present invention is available from several commercial sources. Bubble Wrap®, AirCap® and PolyCap® are all available from Sealed Air Corporation, Saddle Brook, N.J., and are useful in the present invention. Other sources of bubble pack useful in the present invention are available from BrownCore International, Milwaukee, Wis. and Associated Bag Company, Milwaukee, Wis.

A particularly preferred bubble pack made from thermoplastic polyurethane is available from Sealed Air Corporation, Hudson, N.C. It is preferred that the thermoplastic polyurethane bubble pack have the following physical properties: gauge of the polyurethane film ranging from ½ mil to 12 mil, air cellular height ranging from 1/16 to ½ inch, air cellular diameter ranging from 1/16 to 1¼ inches, tensile strength 549.64 lbs/in², elongation 434.76% and tear strength 77.10 lbs/in. Furthermore, it is desirable not to completely inflate the bubble of the bubble pack. The bubble inflation can be between approximately 30% and 90% by volume.

It has been unexpectedly found as a part of the present invention that when a thermosetting polyurethane foam is used as the foam layer 64 and bubble pack 72 is made from a thermoplastic polyurethane, the thermosetting polyurethane foam and the thermoplastic polyurethane bubble pack form chemical bonds between each other, thereby securely bonding or attaching the foam layer to the bubble pack. The bond between the thermosetting polyurethane foam and the thermoplastic polyurethane bubble pack is of a strength such that when one attempts to pull the bubble pack away from the foam, the foam will tear before the bond will break.

The chemical bond between the bubble pack and foam layer is advantageous when it is desired that the bubble pack becomes a portion of the finished product along with the foam. In another application, it is desirable to remove the bubble pack from the foam, so that in those applications, it is not desirable to use a thermosetting polyurethane foam and a thermoplastic polyurethane bubble pack.

Figure 2:
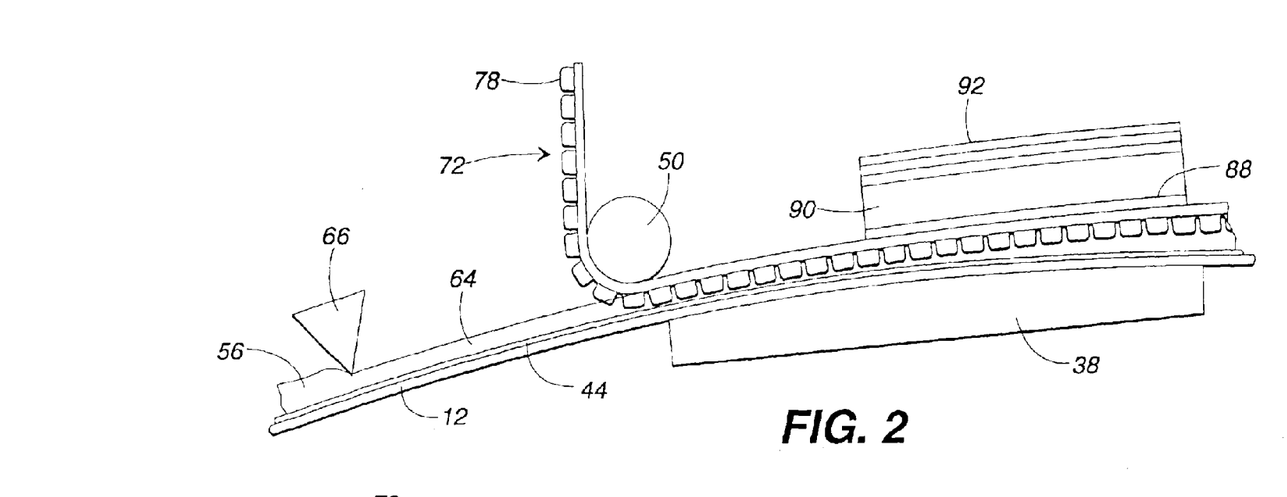
FIG. 2 is a partial detail view of the apparatus shown in FIG. 1.

As best seen in FIG. 2, the layer of bubble pack 72 is applied to the layer of foam 64 with the bubbles 78 projecting downwardly toward the foam. The bubble pack 72 is fed from a supply roll 80 around idle rollers 82, 84, 86 and under marriage bar 50. As the bubble pack 72 passes under the marriage bar 50, the bubble pack 72 is pressed against the uncured layer of foam 64 with sufficient force so that the bubbles 78 extend and penetrate into the foam and the foam at least partially surrounds each of the plurality of bubbles; preferably, the foam completely or substantially completely surrounds each of the plurality of bubbles. By the foam substantially completely surrounding the bubbles, it is meant that there may be occasional air pockets that form that prevent the foam from completely surrounding each of the bubbles, but that the majority of the bubbles are completely surrounded. The foam layer 64 is therefore sandwiched between the bubble pack layer 72 and the fabric layer 44.

After the bubble pack 72 and foam layer 64 are married together under the marriage bar 50, the combination is carried by the conveyor belt 12 over the heated plates 38, 40, 42. The heated plates 38, 40, 42 heat the thermosetting polyurethane-forming reactants to thereby cause the polyurethane-forming reaction to take place, and, thus, cause the layer 64 to solidify and cure into a solid foam. In order to do this, the heated plates 38, 40, 42 provide sufficient heat to heat the layer 64 to a temperature between approximately 110° and 325° F.

Optionally, if the polyurethane-forming reactants are chemically blown to form the foam layer, during all or part of the time that gas is being evolved by the polyurethane-forming in situ foaming reaction, it is desirable to pass the laminated composite comprising the fabric 44, foam layer 64 and the bubble pack 72 under a compressive force of between approximately 0.2 to 5 ounces per square inch, preferably between approximately 1 and 2 ounces per square inch, for a period of between approximately 1 and 100 seconds. This is accomplished by drawing the composite laden belt 12 under a blanket of predetermined weight. The blanket comprises a low friction fabric 88, preferably Teflon-coated fiberglass, which rides over the base layer 74 of the bubble pack 72, a layer of load distributing foam 90, preferably polyurethane foam, disposed on the low friction fabric and a load of thin metal sheets 92 disposed on top of the load distributing foam.

After the layer 64 is cured, the laminated composite comprising the fabric 44, foam layer 64 and bubble pack 72 are stripped from the belt 12 at the roller 52 and wound onto a take-up roll 54. The finished cushioned foam can be unrolled from the take-up roll 54 and, if desired, cut into desired shapes, such as into shoe insoles, automotive carpeting, and the like.

Figure 6:
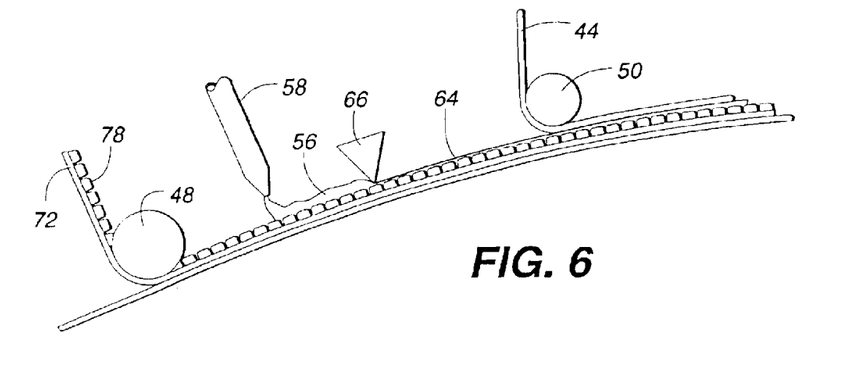
FIG. 6 is schematic partial view of an alternate disclosed embodiment of apparatus for making the cushioned polymeric foam composition of the present invention.

With reference to FIG. 6 there is disclosed an alternate disclosed embodiment of the present invention. The process is as described above except that the bubble pack 72 is first disposed on the conveyor belt 12 after passing under the idle roller 48 with the bubbles 78 extending upwardly. The puddle 56 of frothed, thermosetting polyurethane foam is then applied to the bubble-side of the bubble pack 72 by the traversing hose 58 and is smoothed into a layer by the doctor bar 66. A substrate 44 is then applied to the top of the uncured, shaped layer of thermosetting polyurethane foam 64 after passing under the marriage bar 50.

Figure 7:
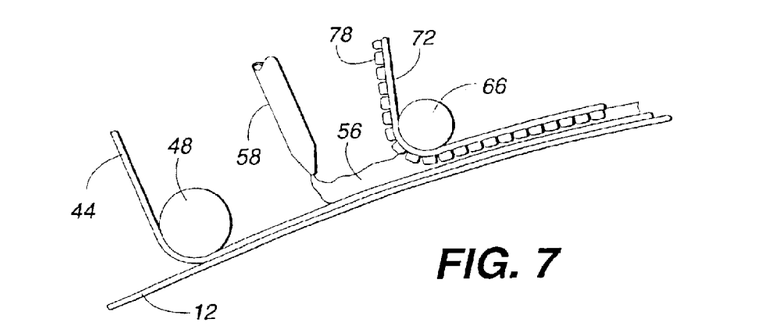
FIG. 7 is schematic partial view of an alternate disclosed embodiment of apparatus for making the cushioned polymeric foam composition of the present invention.

With reference to FIG. 7 there is disclosed another alternate disclosed embodiment of the present invention. The process is as described above except that the substrate 44 is first disposed on the conveyor belt 12 after passing under the idle roller 48. The puddle 56 of uncured, thermosetting polyurethane foam is then applied to the substrate 44 by the traversing hose 58. The bubble pack 72 with the bubbles extending downwardly is then passed under the doctor bar 66 thereby squeezing the polyurethane foam between the bubbles 78 of the bubble pack and forming the puddle 56 into a foam layer of desired thickness between the substrate 44 and the bubble pack.

Figure 8:
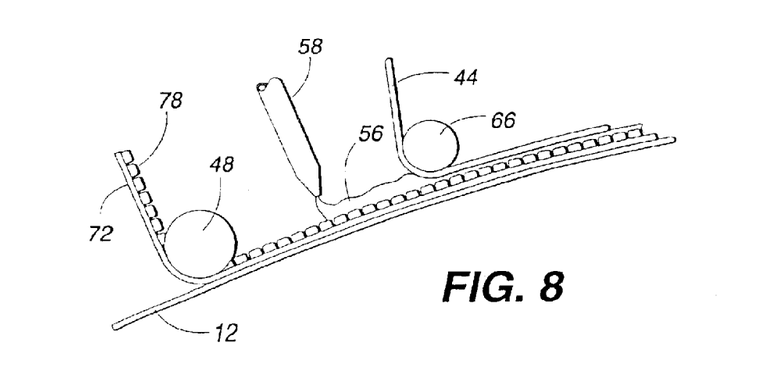
FIG. 8 is schematic partial view of an alternate disclosed embodiment of apparatus for making the cushioned polymeric foam composition of the present invention.

With reference to FIG. 8 there is disclosed another alternate disclosed embodiment of the present invention. The process is as described above except that the bubble pack 72 is first disposed on the conveyor belt 12 after passing under the idle roller 48 with the bubbles 78 extending upwardly. The puddle 56 of uncured, thermosetting polyurethane foam is then applied to the bubble pack 72 by the traversing hose 58. The substrate 44 is then passed under the doctor bar 66 thereby squeezing the uncured, thermosetting polyurethane foam between the bubbles 78 of the bubble pack 72 and forming the puddle 56 into a foam layer of desired thickness between the substrate and the bubble pack.

Figure 9:
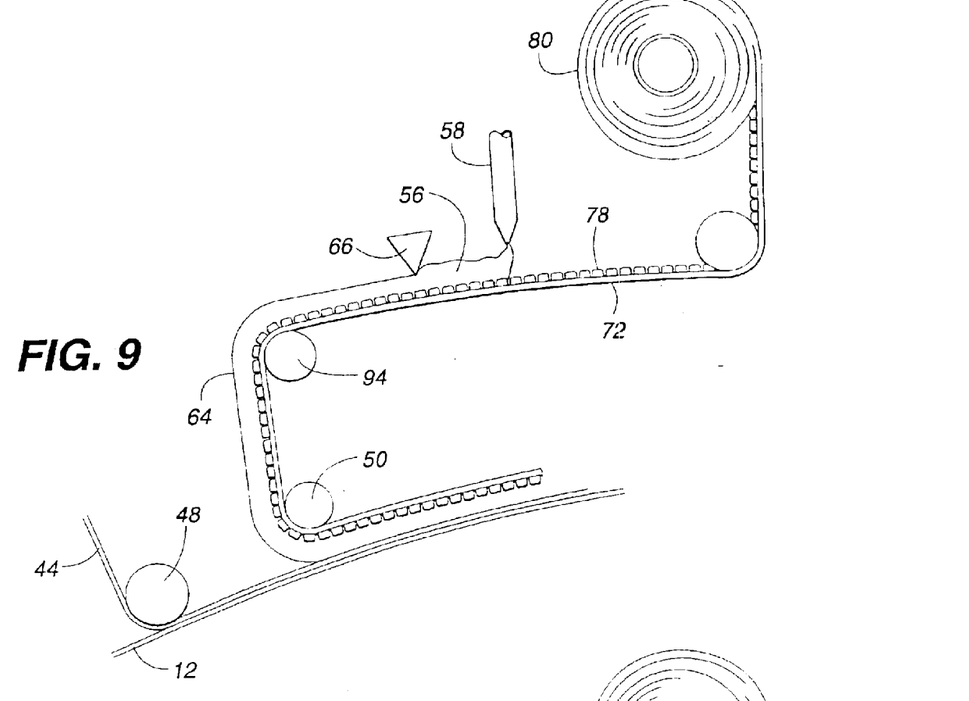
FIG. 9 is schematic partial view of an alternate disclosed embodiment of apparatus for making the cushioned polymeric foam composition of the present invention.

With reference to FIG. 9 there is disclosed another alternate disclosed embodiment of the present invention. The process is as described above except that the substrate 44 is first disposed on the conveyor belt 12 after passing under the idle roller 48. The puddle 56 of uncured, thermosetting polyurethane foam is then deposited on the bubble-side of the bubble pack 72 by the traversing hose 58. The puddle 56 of polyurethane foam is then shaped into a layer 64 of desired thickness by passing the foam coated bubble pack 72 under the doctor bar 66. The foam coated bubble pack 72 is then passed around an idle roller 94 and under the marriage bar 50 so that the uncured foam on the bubble pack 72 is applied on top of the substrate 44.

Figure 10:
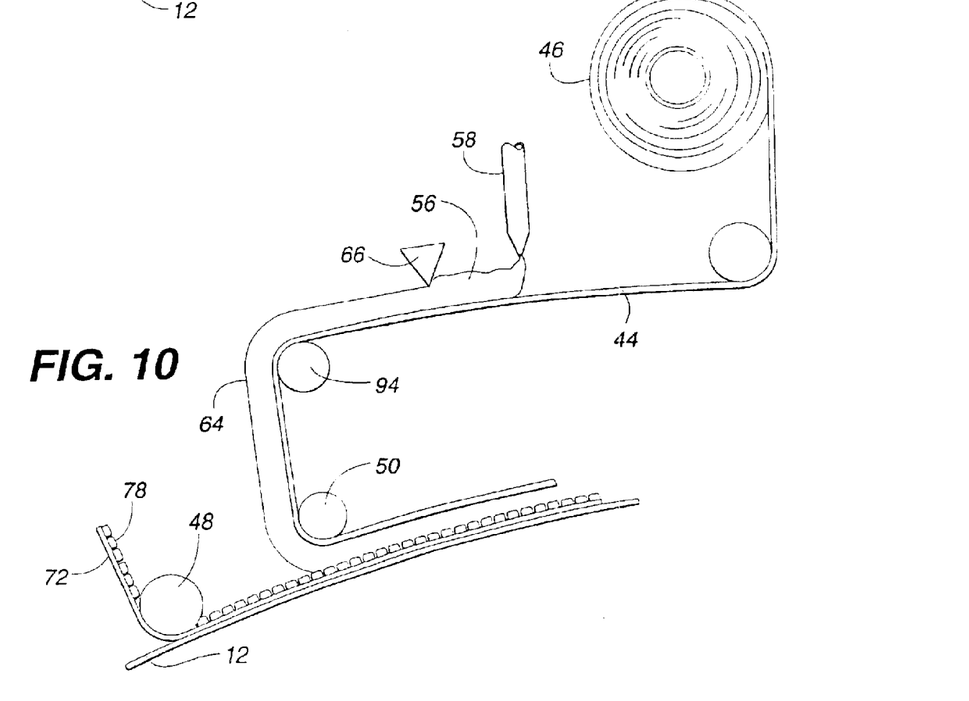
FIG. 10 is schematic partial view of an alternate disclosed embodiment of apparatus for making the cushioned polymeric foam composition of the present invention.

With reference to FIG. 10 there is disclosed another alternate disclosed embodiment of the present invention. The process is as described above except that the bubble pack 72 with the bubbles 78 extending upwardly is first disposed on the conveyor belt 12 after passing under the idle roller 48. The puddle 56 of uncured, thermosetting polyurethane foam is then deposited on the substrate 44. The puddle 56 of polyurethane foam is then shaped into a layer 64 of desired thickness by passing the foam-coated substrate 44 under the doctor bar 66. The foam-coated substrate 44 is then passed around the idle roller 94 and under the marriage bar 50 so that the uncured foam is applied on top of the bubble pack 72. As the foam-coated fabric 44 passes under the marriage bar 50, the shaped layer of uncured foam 64 is pressed against the bubble-side of the bubble pack 72 with sufficient force so that the bubbles 78 extend and penetrate into the foam and the foam at least partially surrounds each of the plurality of bubbles; preferably, the foam completely or substantially completely surrounds the bubbles. The uncured foam layer 64 is therefore sandwiched between the bubble pack layer 72 and the substrate layer 44.

The present invention has been disclosed as using a substrate 44 that has already been prepared and is dispensed from a supply roll 46. However, it is specifically contemplated that for those embodiments of the present invention wherein the substrate 44 is first disposed on the conveyor belt 12 at the idle roller 48 and the substrate is a plastic film, the substrate can be formed in situ on the conveyor belt in the manner disclosed in U.S. Pat. No. 4,405,393 (the disclosure of which is incorporated herein by reference).

Figure 11:
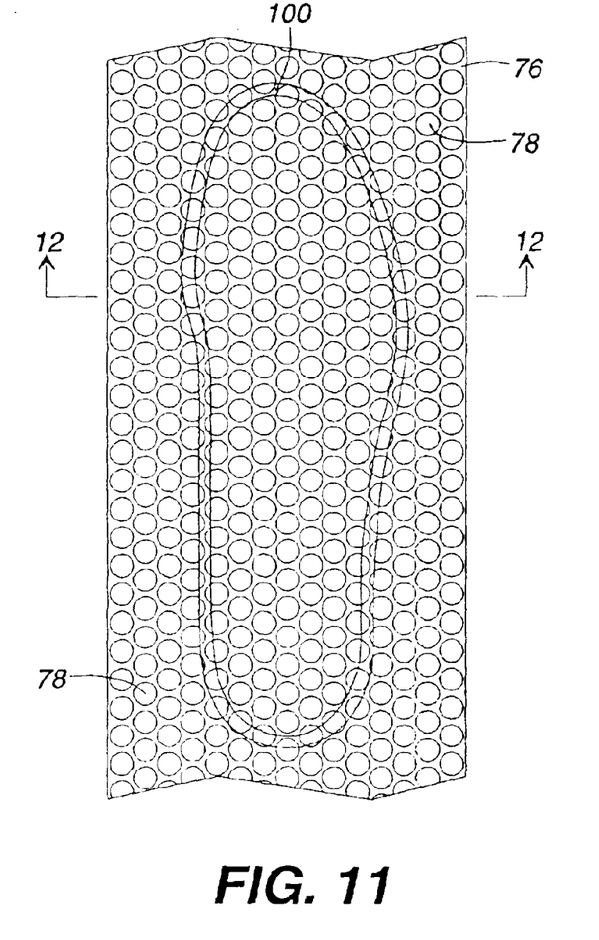
FIG. 11 is a top view of an alternate disclosed embodiment of the bubble pack used in the present invention for making shoe insoles.
Figure 12:
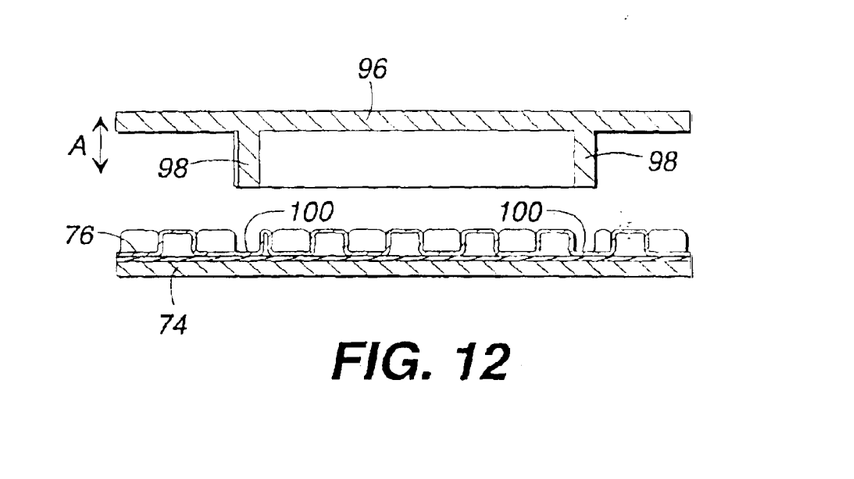
FIG. 12 is a cross-sectional, schematic view of the bubble pack shown in FIG. 11 taken along the line 12—12 and a heated die for heat-sealing the bubble pack.

With reference to FIGS. 11 and 12, there is shown an alternate disclosed embodiment of the bubble pack used in the present invention and of the process of the present invention. If it is desired to use the cushioned foam of the present invention as a shoe insole, when the cushioned foam is cut to a desired shape, at least some of the air bubbles at the cut edge of the shoe insole will be punctured and will no longer provide any cushioning effect. Therefore, before contacting the bubble pack with polyurethane foam, it is preferable to heat-seal the edges of the bubble pack that will be cut to the shape of the shoe insole. As shown in FIG. 12 there is a heated die 96 movable up and down in a vertical direction, as shown at "A." The die 96 has projections 98 corresponding to the desired shape of the shoe insole such that when those projections contact and compress the bubble pack 72, they will heat-seal the top and base layers 74, 76 to form substantially flat portions 100 which later can be cut without destroying any of the air pockets in the bubble pack. This modified bubble pack can then be used in the same manner described above for forming the cushioned foam of the present invention. The finished cushioned foam can then be cut with a cutting die of the same shape as the desired shoe insole and aligned such that the cuts are made only in the flattened, heat-sealed portions 100 of the bubble pack, thereby preserving the integrity of the cushioning bubbles of the bubble pack.

Of course, it is also possible to cut a shaped article, such as a shoe insole, from cushioned foam of the present invention using a conventional cutting die, knife, saw or other cutting apparatus (not shown). The prior art methods of making shoe insoles has been to make each shoe insole individually. A particular advantage of the present invention is the ability to make shaped articles, such as shoe insoles, in a continuous process. Since the cushioned foam can be made in a continuous process, and since a plurality of shoe insoles can be cut from a single section of the cushioned foam, it is possible to make shoe insoles using a continuous process, thereby eliminating the labor intensive process associated with the prior art.

In the embodiment described above, it is disclosed as desirable to use thermosetting polyurethane for the foam and thermoplastic polyurethane for the bubble pack. However, it is also contemplated that bubble pack made from other plastic materials, such as polyethylene and polypropylene, may also be used. If it is desired to use bubble pack made from polypropylene, it is specifically contemplated that the polypropylene can be adhered to the thermosetting polyurethane foam by interposing a layer of adhesive between the foam and the bubble pack. The layer of adhesive can be applied to the foam, to the bubble pack or to both using known application techniques, such as brushing, spraying, roll coating, dipping, etc. The adhesive can be self-curing or can be heat-curable, curable with light or radiation, etc. Adhesives that are useful in the present invention are commercially available under the designation TX-844 from Mational Starch and Chemical Company of Bridgewater, N.J. and Silaprene DC-11938 from Uniroyal Adhesives and Sealants Division of Mishawaka, Ind.

If it is desired to use bubble pack made from polyethylene, it may be adhesively applied to the foam as described above. Alternately, the polyethylene bubble pack can be treated with a corona discharge prior to application to the thermosetting polyurethane foam. By corona treating the polyethylene bubble pack, the bubble pack will bond or adhere to the thermosetting polyurethane foam. Corona treatment of polyethylene is well known to those skilled in the art.

Another disclosed embodiment of the present invention comprises a layer of bubble pack having a plurality of bubbles that extend outwardly from the bubble pack and also have interstices between adjacent bubbles. A viscoelastic composition at least partially fills the interstices of the bubble pack. Optionally, a cover layer can be applied to the viscoelastic layer. The cover layer can be a plastic film, a textile material, a synthetic material, a natural material, a solid material, a permeable material, and the like.

Figure 13:
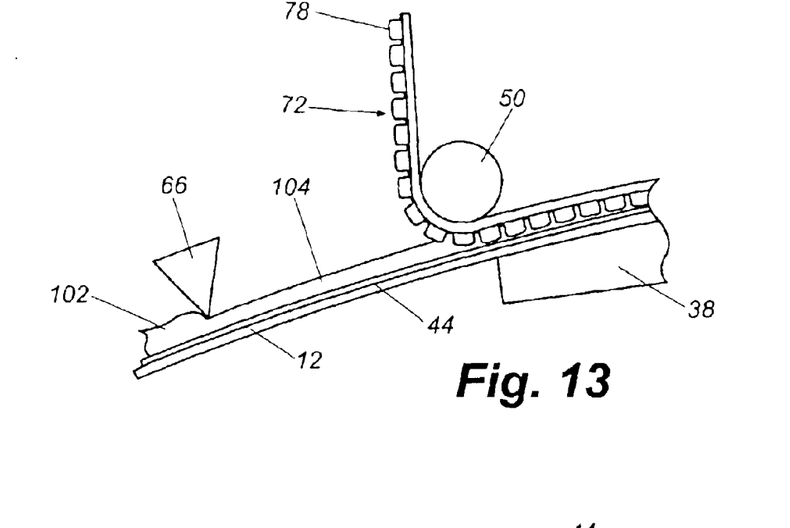
FIG. 13 is a partial schematic view of a disclosed embodiment of apparatus for making an alternate embodiment of the cushioned composition of the present invention.

The process by which this alternate embodiment can be prepared is essentially the same as that illustrated in FIGS. 1–2 and 5–10 above. With reference to FIG. 13 it will be seen that there is disclosed a portion of the apparatus shown in FIG. 1. In order to make the alternate embodiment of the present invention, a substrate 44 is fed from a supply roll 46 around an idler roller 48 and into contact with the belt 12, in the same manner as shown in FIG. 1. The substrate 44 supported by the belt 12 travels trough the arcuate path between idler roller 48, under marriage bar 50 to idler roller 52 where the laminated substrate described further hereinbelow is stripped from the belt and rolled into a take-up roll 54 (FIG. 1). The substrate 44 can be any suitable material, as described above, but will be illustrated herein as a plastic film.

After the film 44 passes under the roller 48 and is supported by the belt 12, a puddle 102 of viscoelastic material is deposited onto the plastic film by a traversing dispensing hose 58 connected to a supply of viscoelastic material (not shown). The dispensing hose 58 has a traverse time of about one and one-half seconds per pass across the conveyor belt 12, which is typically 14 feet wide. The edges (not shown) of the plastic film 44 are turned up so as to form a trough for the viscoelastic material. The turned up edges of the plastic film 44 prevent the viscoelastic material from flowing off of the edges of the film.

Viscoelastic materials are materials are highly elastic solids that behave in some ways like extremely viscous liquids. Viscoelastic materials will slowly recover their original size and shape after being deformed by stress. Viscoelastic materials also have low resilience. Viscoelastic materials can be made from polyurethane, silicone polymers, polyvinyl chloride and natural rubber. It is preferred that the viscoelastic material used in the present invention is a viscoelastic polyurethane. Therefore, the present invention will be illustrated using a viscoelastic polyurethane as the viscoelastic material 102. It is preferred that the viscoelastic polyurethane material used in the present invention have a density of between approximately 40 and 80 pounds per cubic foot.

A viscoelastic polyurethane formulation useful in the present invention is shown below in Table 2.

TABLE 2

| Ingredient | Parts |
|---|---|
| High molecular weight triol | 50.00 |
| High molecular weight diol | 48.00 |
| Low molecular weight diol | 2 |

TABLE 2-continued

| Ingredient | Parts |
|---|---|
| Plasticizer | 40.00 |
| Molecular sieves | 2.00 |
| Color | 0.03 |
| Amine catalyst | 0.07 |
| Isocyanate 344KD | sufficient (index 70–130) |

Table 3 below shows another viscoelastic polyurethane composition useful in the present invention.

TABLE 3

| Ingredient | Parts |
|---|---|
| Jeffol G31-28 | 90 |
| Jeffol G30-650 | 10 |
| Amine catalyst | 0.07 |
| L-5614 | 2 |
| Isocyanate C344KD | 22.7061 |

In Table 3 above, the components are commercially available as follows. Jeffol G31–28 is a high molecular weight triol and Jeffol G30–650 is a low molecular weight triol, both manufactured by Huntsman Polyurethanes, West Deptford, N.J. L-5614 is a silicone surfactant manufactured by Osi Specialties, Greenwich, Conn. C344 KD is an isocyanate manufactured by the Polyurethane Products Division, Textile Rubber and Chemical Company, Inc., Dalton, Ga. Amine catalysts are available from Air Products, Allentown, Pa.

The deposited viscoelastic polyurethane reactant mixture on the film 44 is then smoothed into a reactive layer 104 by a doctor bar 66. In order to aid in the uniform spreading of the uncured viscoelastic polyurethane reactants on the film 44, the belt 12 is flattened as described above. The doctor bar 66 is adjusted to smooth the puddle 102 of viscoelastic polyurethane-forming reactants into a layer between approximately $3/32$ and 1 inch thick.

Figure 3:
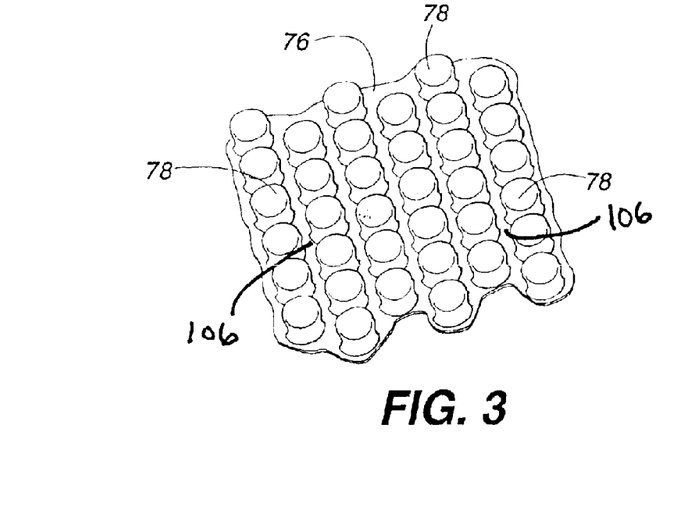
FIG. 3 is a top view of a disclosed embodiment of bubble pack used to form the cushioned polymeric foam composition of the present invention.

Simultaneously with the deposition of the thermosetting viscoelastic polyurethane-forming reactants onto the conveyor belt, a single layer of bubble pack 72 is applied to the top of the viscoelastic layer 104. The bubble pack 72 is the same as described above for the previous embodiment. As previously described, the bubble pack 72 includes a plurality of bubbles 78 that project outwardly from the laminated base and top layers 74, 76, respectively. Between adjacent bubbles 78 of the bubble pack 72 are interstices 106 (FIG. 3). The relationship between the bubbles 78 of the bubble pack 72 and the viscoelastic polyurethane layer 104 is such that the gauge or height of the viscoelastic layer can be greater than the height of the bubbles or it can be equal to the height of the bubbles.

As shown in FIG. 13, the layer of bubble pack 72 is applied to the viscoelastic layer 104 with the bubbles 78 projecting downwardly toward the viscoelastic layer. As the bubble pack 72 passes under the marriage bar 50, the bubble pack 72 is pressed against the uncured viscoelastic polyurethane layer 104 with sufficient force so that the bubbles 78 extend and penetrate into the viscoelastic layer and the viscoelastic polyurethane composition at least partially fills the interstices 106; preferably, the viscoelastic material completely or substantially completely fills the interstices. By the viscoelastic material substantially completely filling the interstices, it is meant that there may be occasional air pockets that form that prevent the viscoelastic material from completely filling the interstices, but that the majority of the interstices are completely filled. The viscoelastic polyurethane layer 104 is therefore sandwiched between the bubble pack layer 72 and the film 44.

After the bubble pack 72 and uncured viscoelastic polyurethane layer 104 are married together under the marriage bar 50, the combination is carried by the conveyor belt 12 over the heated plates 38, 40, 42. The heated plates 38, 40, 42 heat the thermosetting viscoelastic polyurethane-forming reactants to thereby cause the polyurethane-forming reaction to take place, and, thus, cause the viscoelastic layer 104 to cure. In order to do this, the heated plates 38, 40, 42 provide sufficient heat to heat the layer 104 to a temperature between approximately 110° and 325° F. (43°–162° C.).

After the viscoelastic layer 104 is cured, the laminated composite comprising the film 44, viscoelastic layer 104 and bubble pack 72 are stripped from the belt 12 at the roller 52 and wound onto a take-up roll 54. The finished, cushioned laminate can be unrolled from the take-up roll 54 and, if desired, cut into desired shapes, such as into shoe insoles, automotive fabrics, and the like.

Figure 14:
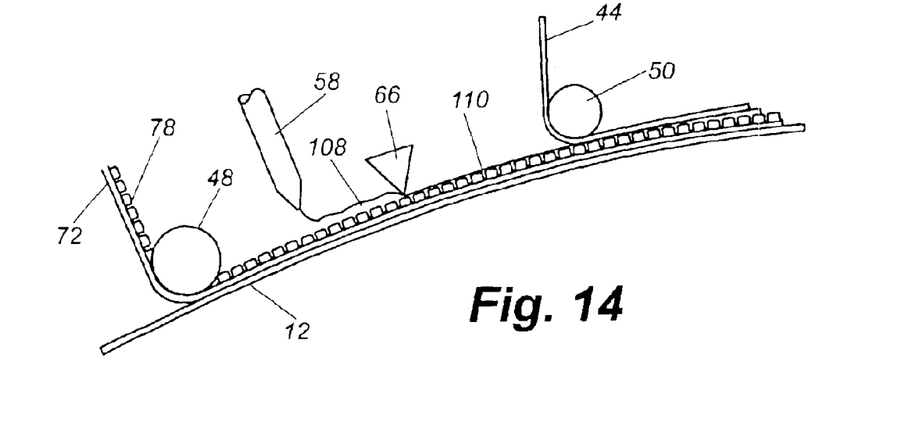
FIG. 14 is a partial schematic view of an alternate disclosed embodiment of apparatus for making the alternate embodiment of the cushioned composition of the present invention.
Figure 15:
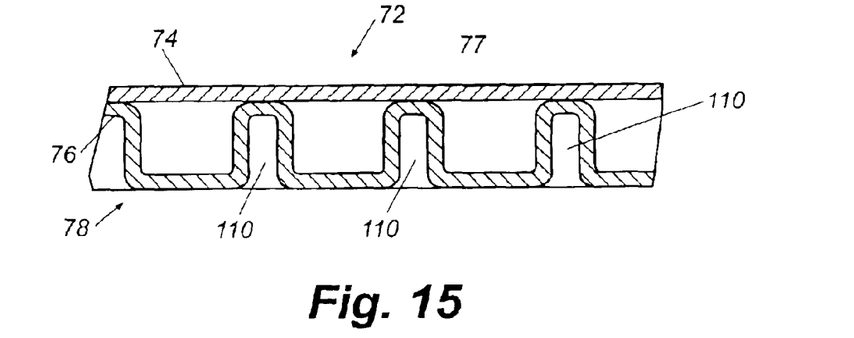
FIG. 15 is a partial cross-sectional view of an alternate disclosed embodiment of a cushioned polymeric composite made by the process shown in FIGS. 13 and 14.

Another process by which the alternate embodiment of the present invention can be made is shown in FIG. 14. With reference to FIG. 14 it will be seen that there is disclosed a portion of the apparatus shown in FIG. 6. The process is as described above except that the bubble pack 72 is first disposed on the conveyor belt 12 after passing under the idle roller 48 with the bubbles 78 extending upwardly. The puddle 108 of viscoelastic polyurethane-forming reactants is then applied to the bubble-side of the bubble pack 72 by the traversing hose 58 and is smoothed into a layer 110 by the doctor bar 66. As the bubble pack 72 passes under the marriage bar doctor bar 66, the viscoelastic layer 110 is pressed against the bubble pack 72 with sufficient force so that the viscoelastic polyurethane composition at least partially fills the interstices 106; preferably, the viscoelastic material completely or substantially completely fills the interstices. Optionally, a substrate 44 is then applied to the top of the uncured, shaped layer 110 of viscoelastic polyurethane-forming reactants after passing under the marriage bar 50. The viscoelastic polyurethane is then cured by heating as described above. When a substrate 44 is used, the resulting product has a structure similar to that shown in FIG. 4, except the layer 64 is the viscoelastic material. When a substrate 44 is not used, the resulting product has a structure as shown in FIG. 15. The finished, cushioned laminate can be, if desired, cut into desired shapes, such as into shoe insoles, automotive fabrics, and the like.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of forming a foam product comprising the steps of:
    forming a layer of uncured thermosetting polyurethane foam;
    applying to said layer of uncured foam a layer of bubble pack made of a thermoplastic material capable of bonding to polyurethane, such that the bubbles that extend outwardly from said bubble pack at least partially penetrate into said uncured foam; and
    curing said layer of uncured thermosetting polyurethane foam, whereby said thermosetting polyurethane foam chemically bonds to said bubble pack.

2. The method of claim 1, wherein said bubbles that extend outwardly from said bubble pack substantially completely penetrate into said uncured foam.

3. The method of claim 1, wherein said thermosetting polyurethane foam is about 1 to 10 mm in thickness.

4. The method of claim 1, wherein said thermosetting polyurethane foam is about 2 to 5 mm in thickness.

5. The method of claim 1, wherein said thermosetting polyurethane foam is cured by heating it to a temperature of about 110° to 325° F.

6. A method of forming a foam product comprising the steps of:
    applying to a layer of bubble pack made of thermoplastic material capable of bonding to polyurethane a layer of frothed, uncured thermosetting polyurethane foam, such that bubbles that extend outwardly from said bubble pack are at least partially surrounded by said uncured foam; and
    curing said layer of uncured thermosetting polyurethane foam, whereby said thermosetting polyurethane foam chemically bonds to said bubble pack.

7. The method of claim 6, wherein said bubbles that extend outwardly from said bubble pack substantially completely penetrate into said uncured foam.

8. The method of claim 6, wherein said thermosetting polyurethane foam is about 1 to 10 mm in thickness.

9. The method of claim 6, wherein said thermosetting polyurethane foam is about 2 to 5 mm in thickness.

10. The method of claim 6, wherein said thermosetting polyurethane foam is cured by heating it to a temperature of about 110° to 325° F.

11. A method of forming a foam product comprising the steps of:
    forming a layer of frothed, uncured thermosetting polyurethane foam, said layer of foam having a first surface and a second surface;
    applying to said first surface of said layer of uncured thermosetting polyurethane foam a layer of bubble pack made of thermoplastic material capable of bonding to polyurethane, said bubble pack having a plurality of bubbles that project outwardly from said layer;
    applying pressure to said layer of uncured thermosetting polyurethane foam and said layer of bubble pack so that said uncured thermosetting polyurethane foam at least partially surrounds each bubble of said plurality of outwardly projecting bubbles; and
    applying to said second surface heat of a temperature and for a time sufficient to cure said layer of uncured polymeric foam, but not sufficient to adversely affect said layer of bubble pack.

12. The method of claim 11, wherein said uncured polymeric foam substantially completely surrounds each bubble of said plurality of outwardly projecting bubbles.

13. The method of claim 11, wherein said thermosetting polyurethane foam is about 1 to 10 mm in thickness.

14. The method of claim 11, wherein said thermosetting polyurethane foam is about 2 to 5 mm in thickness.

15. The method of claim 11, wherein said thermosetting polyurethane foam is cured by heating it to a temperature of about 110° to 325° F.

16. A method of forming a foam product comprising the steps of:
    applying to a substrate a layer of frothed, uncured thermosetting polyurethane foam;
    applying to said layer of uncured foam on said substrate a layer of bubble pack made of thermoplastic material capable of bonding to polyurethane, applying pressure to said layer of uncured polymeric foam and said layer of bubble pack such that bubbles that extend outwardly from said bubble pack at least partially penetrate into said uncured foam; and curing said layer of uncured foam to form a laminate comprising said substrate, said cured foam and said bubble pack.

17. The method of claim 16, wherein said substrate is a fabric.

18. The method of claim 16, wherein said substrate is a carpet.

19. The method of claim 16, wherein said substrate is paper.

20. The method of claim 16, wherein said substrate is a plastic film.

21. The method of claim 20, wherein said plastic film is selected from polyurethane, polyethylene and polypropylene.

22. A method of forming a foam product comprising the steps of:

applying to a layer of bubble pack made from thermoplastic material capable of bonding to polyurethane a layer of frothed, uncured thermosetting polyurethane foam, such that bubbles that extend outwardly from said bubble pack are at least partially surrounded by said uncured foam;

applying to said layer of uncured polymeric foam on said bubble pack a substrate; and curing said layer of uncured polymeric foam.

23. The method of claim 22, wherein said substrate is a fabric.

24. The method of claim 22, wherein said substrate is a carpet.

25. The method of claim 22, wherein said substrate is paper.

26. The method of claim 22, wherein said substrate is a plastic film.

27. The method of claim 26, wherein said film is selected from polyurethane, polyethylene and polypropylene.

28. A method of forming a product comprising the steps of:

applying to a layer of thermoplastic polyurethane bubble pack having a plurality of bubbles that extend outwardly from said bubble pack and also have interstices between adjacent bubbles a thermosetting viscoelastic polyurethane composition, such that the thermosetting viscoelastic polyurethane composition at least partially fills the interstices of said bubble pack; and curing said thermosetting viscoelastic polyurethane composition, whereby said thermosetting viscoelastic polyurethane composition chemically bonds to said bubble pack.

29. The method of claim 1, wherein said bubble pack is made from a plastic material selected from polyurethane, polyethylene or polypropylene.

30. The method of claim 1, wherein said bubble pack is made from thermoplastic polyurethane.

31. The method of claim 28, wherein said viscoelastic composition substantially fills the interstices of said bubble pack.

32. The method of claim 28, wherein said bubble pack is about 3/32 to 1 inch in thickness.

33. The method of claim 28, wherein said viscoelastic composition is cured by heating it to a temperature of about 110° to 325° F.

34. A method of forming a product comprising the steps of:

forming a layer of a thermosetting viscoelastic polyurethane composition;

applying to said layer of thermosetting viscoelastic polyurethane composition a layer of bubble pack having a plurality of bubbles that extend outwardly from said bubble pack and also have interstices between adjacent bubbles, such that the thermosetting viscoelastic polyurethane composition at least partially fills the interstices of said bubble pack, wherein said bubble pack is made from a thermoplastic material capable of bonding to polyurethane; and curing said thermosetting viscoelastic polyurethane composition, whereby said thermosetting viscoelastic polyurethane composition chemically bonds to said bubble pack.

35. The method of claim 34, wherein said thermoplastic material is selected from polyurethane, polyethylene or polypropylene.

36. The method of claim 28 further comprising applying a substrate to said thermosetting viscoelastic polyurethane composition before said thermosetting viscoelastic polyurethane composition is completely cured so as to adhere said substrate to said thermosetting viscoelastic polyurethane composition.

37. The method of claim 36, wherein said substrate is a fabric.

38. The method of claim 36, wherein said substrate is a carpet.

39. The method of claim 36, wherein said substrate is paper.

40. The method of claim 36, wherein said substrate is a plastic film.

* * * * *